H. W. BROWN.
SIGNAL AND SPOT LIGHT FOR AUTOMOBILES.
APPLICATION FILED APR. 16, 1919.
1,335,364. Patented Mar. 30, 1920.
3 SHEETS—SHEET 1.
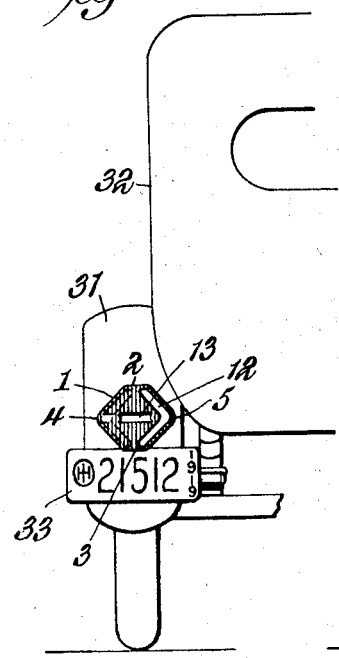
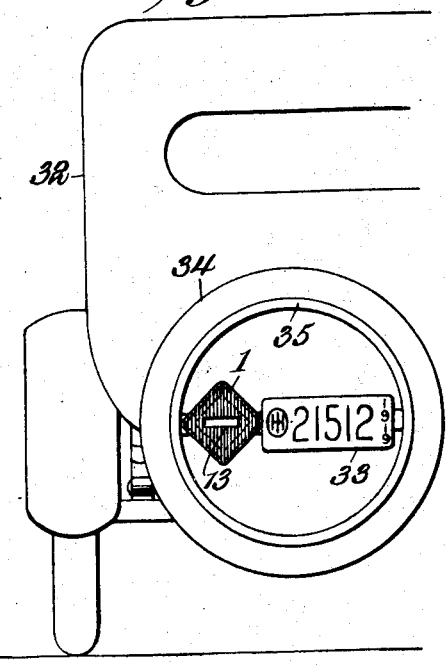
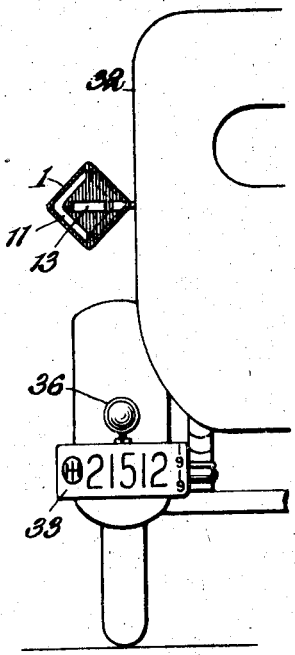
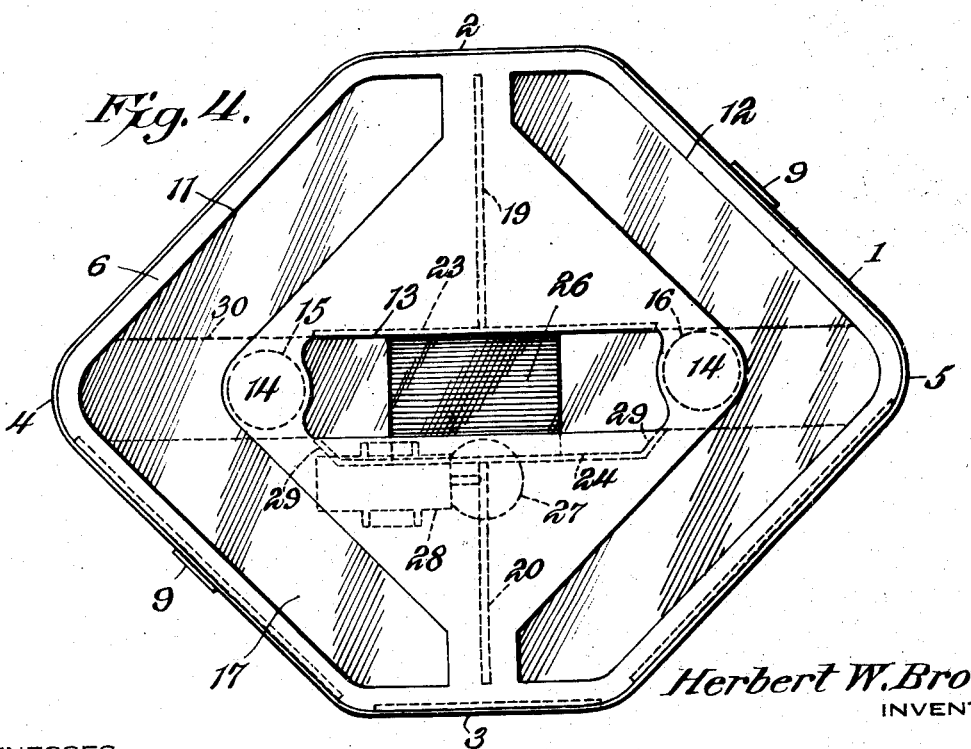
Herbert W. Brown, INVENTOR,

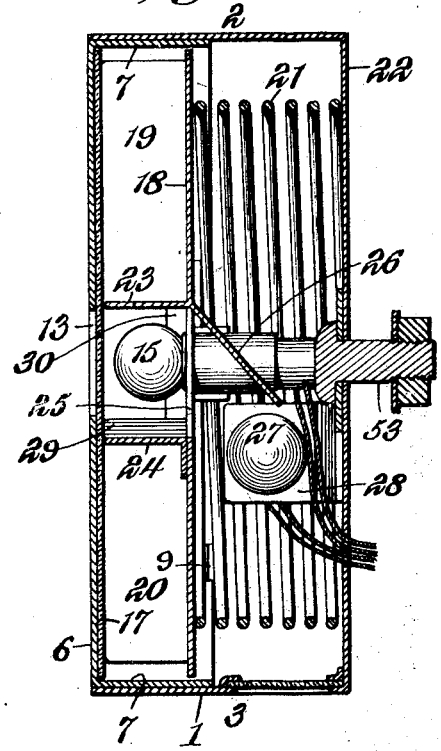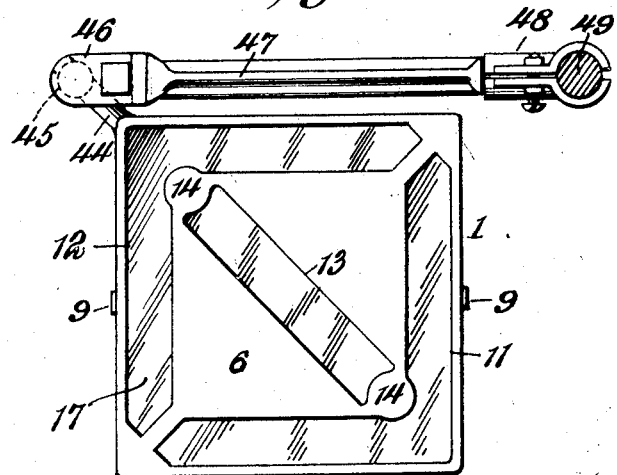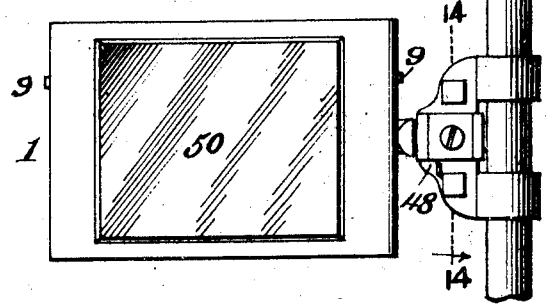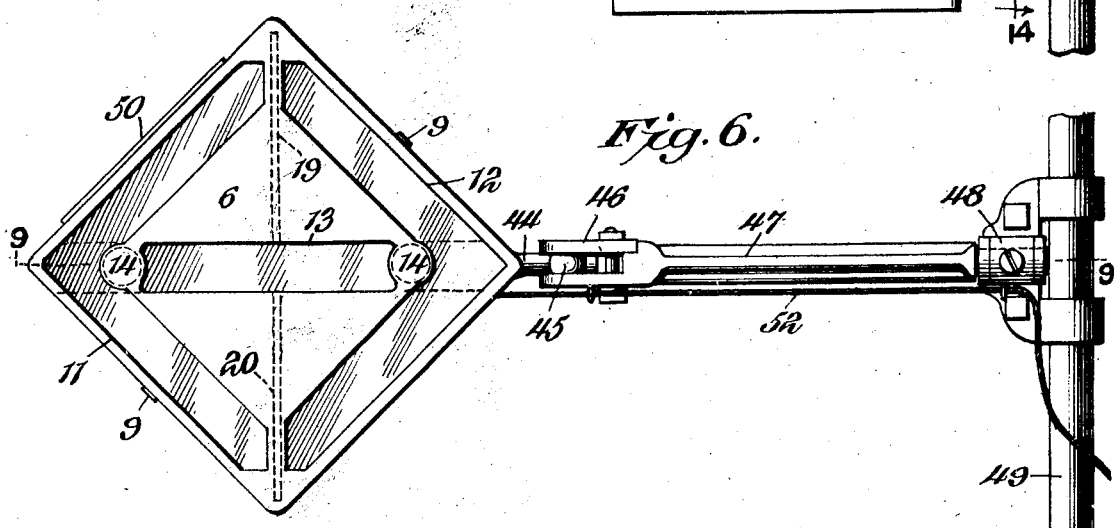

H. W. BROWN.
SIGNAL AND SPOT LIGHT FOR AUTOMOBILES.
APPLICATION FILED APR. 16, 1919.
1,335,364.
Patented Mar. 30, 1920.
3 SHEETS—SHEET 3.
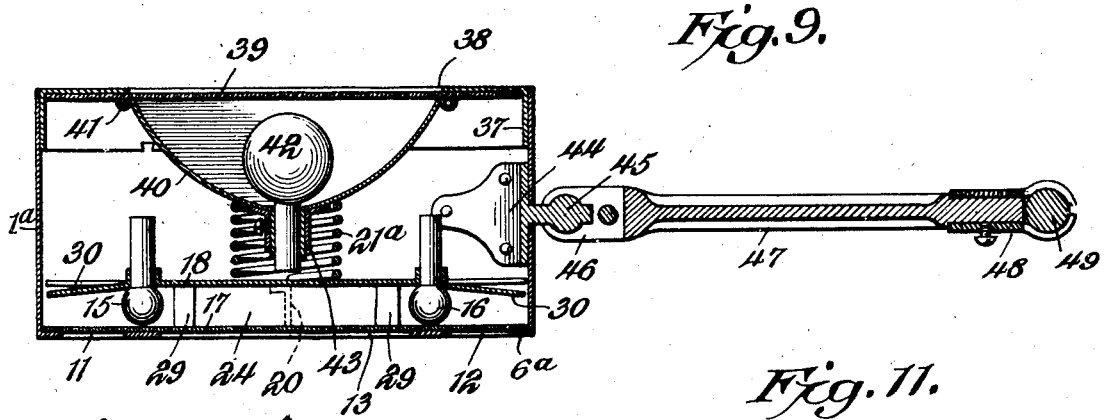
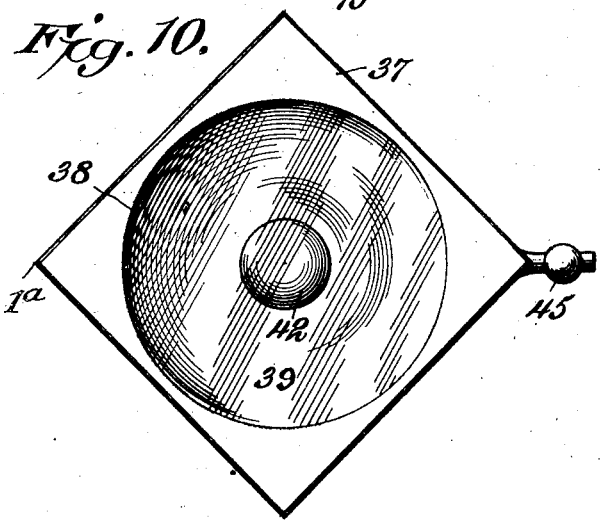
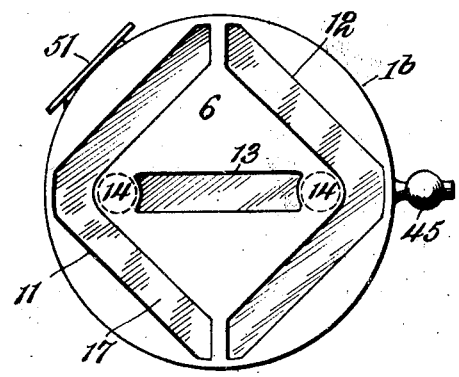
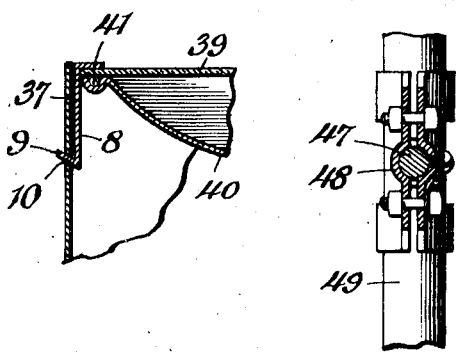
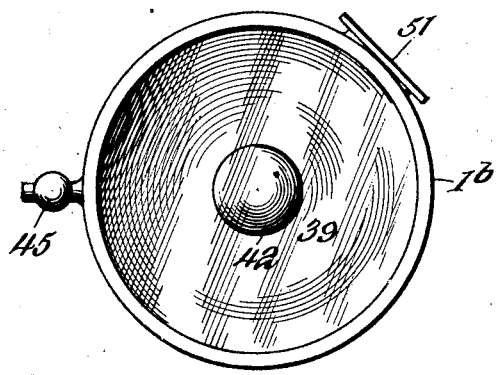
Herbert W. Brown, INVENTOR
WITNESSES

UNITED STATES PATENT OFFICE.

HERBERT W. BROWN, OF ASHLAND, OHIO.

SIGNAL AND SPOT LIGHT FOR AUTOMOBILES.

1,335,364. Specification of Letters Patent. Patented Mar. 30, 1920.

Application filed April 16, 1919. Serial No. 290,478.

*To all whom it may concern:*

Be it known that I, HERBERT W. BROWN, a citizen of the United States, residing at Ashland, in the county of Ashland and State of Ohio, have invented a new and useful Signal and Spot Light for Automobiles, of which the following is a specification.

This invention has reference to signal and spot-lights for automobiles, and its object is to provide a compact and efficient light applicable to different parts of the automobile to serve as a spot-light, or as a tail light, or as both, and which may be caused to produce a direction signal visible to the operator of a following vehicle and apprising such operator as to the intended course of the forward vehicle. The invention is capable of use as a direction signal, either alone or in conjunction with a spot-light of which it may form a part.

The invention comprises a suitable casing in which electric lamps may be housed so as to provide light sources capable of individual energization in order to illuminate certain parts of the signal means, either separately or simultaneously, whereby to constitute a danger signal or direction signal in accordance with the arrangement of illumination. The invention may be utilized simply as a tail light, or, by a change in the illumination, indicate that the vehicle is about to turn to one side or the other. The invention is capable of association with a spot-light so that both the spot-light and the direction signaling means may be within one casing and may be located in the position usually occupied by a spot-light, that is, adjacent to the operator's seat of the vehicle. In such event the spot-light part of the device may be operated in the usual manner and for the customary purpose, and, at the same time, an operator of a following vehicle is apprised of the intended course to be pursued by the forward vehicle. When the invention is used as a tail light the direction signaling features are retained, but, of course, the spot-light features may be omitted. The tail light features are so arranged that the automobile number tag is properly illuminated at night, whether or not the direction signaling feature is being utilized.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a rear elevation of a portion of an automobile with the invention applied to the rear wheel guard.

Fig. 2 is a similar rear elevation with the invention applied to the extra tire holder.

Fig. 3 is a rear elevation of an automobile with the invention in the form of a spot-light and direction signal.

Fig. 4 is an elevation of a structure embodying the invention and showing features of the invention adapting it for use as a tail light and for illuminating the automobile number tag.

Fig. 5 is a central vertical section through the structure shown in Fig. 4, some parts being shown in elevation.

Fig. 6 is an elevation of the invention as applied to a spot-light and in extended position on a supporting arm.

Fig. 7 is a plan view of the structure shown in Fig. 6 with the spot-light folded back toward the vehicle in order to utilize a rear-view mirror carried by the spot-light casing.

Fig. 8 is a rear elevation of the spot-light structure as seen in Fig. 7.

Fig. 9 is a section on the line 9—9 of Fig. 6.

Fig. 10 is an elevation of the spot-light side of the structure shown in Fig. 6, but omitting the supporting arm.

Fig. 11 is an elevation of the direction signal side of a combination spot-light and signaling structure with a round casing.

Fig. 12 is an elevation of the spot-light side of the same structure.

Fig. 13 is a detail section showing a catch structure for detachably holding parts of the device together.

Fig. 14 is a section on the line 14—14 of Fig. 8.

Referring to the drawings, and more particularly to Figs. 4, 5, 9 and 13, there is shown a body or casing 1 of generally rectangular shape, such casing also appearing in some of the other views, as for instance, in Figs. 1, 2, 3, 6, 7 and 8. Two opposite corners of the casing are cut off or truncated, as indicated at 2 and 3 in the structure shown in Figs. 1 and 4, although, except for appearance, the corner 2 in Figs. 1 and 4 need not be cut off. Moreover, and this is also for appearance, the other corners 4 and 5 may be rounded, as best shown in Figs. 1 and 4.

The casing 1 is provided with a cover plate 6 conforming in general outline to the shape of the casing. This cover plate is provided with a marginal flange 7 of suitable size and shape to snugly fit into the body 1 and at opposite sides has catch fingers 8, each terminating in a hook projection 9 to extend through a slot 10 in the side of the casing so that when the hook ends 9 are engaged with the casing the cover is held in place. By pressing inwardly on the hook ends 9 they may be pushed back sufficiently to release the cover plate and the latter may then be removed from the casing to expose interior parts of the latter for inspection, repairs, or replacing of parts.

Extending along the two sides of the cover plate terminating at the corner 4 is a V-shaped slot 11, and extending along the two sides of the cover plate meeting at the corner 5 is another V-shaped slot 12, the apices of the two slots being in the diagonal of the cover plate terminating at the two corners 4 and 5, while the adjacent ends of the two slots approach the corners 2 and 3 until in close spaced relation. Extending through the cover plate 6 in the diagonal of the corners 4 and 5 is an elongated slot 13 with the portion of the cover plate between each end of the slot 13 and the slots 11 and 12 enlarged into rounded contour, as indicated at 14, each part 14 being of sufficient size to hide an electric light bulb 15 or 16, as the case may be, placed within the casing back of the cover 6.

Immediately back of the cover plate there is located a sheet 17 of light transmitting material, such, for instance, as glass, and as such glass sheet is to transmit cautionary or warning light it may be red glass, such color being universally recognized as a warning color.

Within the casing at a suitable distance back of the glass plate 17, in spaced relation thereto, is a plate 18, best shown in Fig. 5 but also appearing in Figs. 4 and 9. The plate 18 carries webs or partitions 19, 20 arranged in alinement with each other in the diagonal of the corners 2 and 3 and of sufficient length to interpose between the adjacent ends of the slots 11 and 12 through the cover plate 16. The partitions 19 and 20 also serve as spacers for the plate 18 and hold the plate 17 firmly against the inner face of the cover 6. The holding effect of the plate 18 is brought about by a spring 21 between the plate 18 and the rear wall 22 of the casing 1 in the structure shown in Figs. 4 and 5. In Fig. 9, however, a spring 21ª serves a similar purpose but is somewhat differently arranged, since the structure of Fig. 9 is a combination structure of direction signaling and spot-light devices.

Extending lengthwise of the slot 13 on opposite sides thereof are webs or partitions 23, 24 respectively, of a width to reach from the plate 18 to the glass plate 17. The plate 18 is also provided with a slot 25 somewhat wider than and back of the slot 13. Projecting into the casing from the plate 18 along one edge of the slot 25, say that edge having the web 23, is another partition or web 26 arranged at a slant to the plane of the plate 18 and made white or otherwise treated to serve as a reflector. The web 26 is about as wide as the slot 25. Within the casing back of the plate 18 but to one side of the partition 26 is an electric light bulb 27 carried by a suitable holder 28 and so positioned as to illuminate the reflecting surface of the web or partition 26 and direct the reflected light through the slot 25 and out through the slot 13 with the emitted light appearing red because of the red glass plate 17. The electric light bulb or lamp 27 is so positioned as to be about midway of the length of the slot 13 and out of direct view through said slot so that an observer will merely see an elongated band of light through the slot 13. This band of light being, in the construction shown, arranged substantially horizontally and closely approached at the ends by the arrow shaped slots 11 and 12. Light from the lamp 27 is utilized continuously, at night, for tail light purposes. This light is prevented from spreading toward the top and bottom and so reaching the slots 11 and 12, by the webs 23 and 24 forming a channel or alley lengthwise and back of the slot 13. The web or partition 24 is set somewhat below the lower edge of the slot 13 and the web has end portions 29 slanting upwardly to the lower margin of the slot 13 so as to cut off spread of light from the bulb 27 to the slots 11 and 12.

Light from the illuminating elements or bulbs 15 or 16 will find its way back of the slots 11 or 12 in accordance with which of the two bulbs is energized. Back of the apex portion of each arrow shaped slot 11 and 12 there is cut out of the plate 18 a flap 30 extending in the same direction as the length of the slot 13 and of like width. This flap 30 is bent at a slight angle toward the front of the casing as shown in Fig. 9, and because of such advance position of the flap it receives illumination from the bulb 15 or 16 at the other side of the casing, whereby when a bulb, say the bulb 15, is energized, not only is the slot 11 illuminated but there is a line of illumination into the slot 12 on the other side by light traveling from the bulb 15 along the alley or channel between the webs 23 and 24, with such light augmented by the reflected light from the bulb 27. The result is that there appears to an observer behind the traveling automobile an arrow shaped index of light pointing in the appropriate direction with the shaft of the arrow prolonged to a greater extent than the length of the slot 13, this prolongation being due to reflection of light from the bent flap 30 at the end of the shaft of the arrow remote from the head of the arrow.

A structure such as so far described may be conveniently located on one of the rear wheel guards 31 of an automobile, such as indicated at 32 in Fig. 1, with the direction signal above a number plate 33 as shown in Fig. 1. It is quite common to mount an extra tire 34 on an automobile with the tire supported on a carrier 35 fast to the rear of the automobile body, and then the direction signal casing 1 is placed to one side of the number plate 33, which latter is located within the carrier 35. Under such circumstances the truncated corners 2 and 3 need not be provided. The arrangement just described is shown in Fig. 2.

When the signal device is to be applied to an automobile already supplied with a tail light, as shown at 36 in Fig. 3, which tail light serves as an illuminating means for the number plate 33, the direction signal may be mounted sufficiently high up on the vehicle to be within easy reach of the operator of the vehicle and may then be combined with a spot-light, as indicated in the arrangements shown in Figs. 7 to 14 inclusive. Under such circumstances a casing 1$^a$ is provided, and such casing may be square in outline, as shown in Figs. 6, 7 and 10, or may be round, as shown at 1$^b$ in Figs. 11 and 12. In Figs. 6, 7 and 9 there is a cover plate 6$^a$ which may be considered as in one piece with the body of the casing, while a plug rim 37 serves as a closure for the other end of the casing. The rim 37 has a cut out 38 backed up by a cover glass 39 which may be a plain glass cover or otherwise. Pressed against the cover glass 39 by the spring 21$^a$ and holding such cover glass properly seated is a reflector 40 with a cushion ring 41 at its margin, which serves also to exclude dust from the interior of the reflector. Within the reflector there is mounted an electric lamp bulb 42 seated in a suitable socket 43 of which no special description is needed.

Fast to the casing 1$^a$ or 1$^b$, as the case may be, is a bracket 44 projecting through the walls of the casing from the interior to the exterior thereof and terminating in a ball 45. Embracing the ball end of the bracket is a clamp 46 on one end of an arm 47 of suitable length and at the other end provided with a clamp 48 of a character suitable for attachment to a post 49, such as is employed in automobiles. No particular description is needed with respect to the clamp 48, since clamps of like character are to be found upon the market. With a supporting arm, such as shown more particularly in Figs. 6, 7 and 9, a combined spot-light and direction signal may be mounted on the vehicle in a manner similar to the showing of Fig. 3, so that the spot-light will project a beam forwardly and the direction signal will be visible to any one back of the vehicle, whereby the operator of the vehicle is not only enabled to illuminate the road forwardly of the automobile but may apprise any person to the rear of an intended change of course.

The ball and socket joint permits the turning of the casing about an axis diagonal of the casing and also the casing may be turned about the ball and socket joint until a portion of the casing forming a side wall between the spot-light face and the direction signaling face is presented toward the operator of the vehicle at such an angle that a mirror 50 carried by the casing may be utilized in the daytime as a means for giving to the operator a rearward view. Such an arrangement is shown in Figs. 7 and 8.

In the case of a casing of rectangular shape, as in Figs. 6, 7 and 8, a mirror of considerable size may be employed and such mirror, because of its size, may be a plain mirror. When the casing 1$^b$, as shown in Figs. 11 and 12, is a cylindrical casing then a smaller mirror 51 may be used and, as is customary with small mirrors, may be of the reducing type to permit the small mirror to show a large field. In Figs. 5 and 6 electric conductors 52 are shown, these conductors being connected to the lamps in the casing, but it is unnecessary to describe these features in detail.

The spot-light portion of the invention need not differ in operation from other spot-lights. When the device is used as a tail light the bulb 27 may be kept burning continuously, therefore displaying a relatively narrow elongated light toward the rear of the vehicle so as to be utilized as a tail light. When, however, it is desired to indicate toward the rear a proposed change in the course of the vehicle an appropriate one of the bulbs 15 and 16 is energized, thereby illuminating the V-shaped opening 11 or 12 and displaying an arrow-shaped light which, because the source of illumination is hidden, is free from any glare and therefore clear. Furthermore, the band of light corresponding to the shaft of the arrow is somewhat elongated because of the illumination of the flap 30 at the end of the shaft remote from the arrow head, the slight angular position of the flap 30 contributing to it provides a centrifugal gun which is compact or of comparatively small dimensions and is therefore readily portable and easily handled for field or trench work. The construction also ensures ease of motion of the impeller, with a minimum of friction and heating, owing to the fact that it is arranged so as to be effectually balanced, as well as to be lubricated or mounted upon anti-friction bearings if desired, so that frictional contact between surfaces is reduced to a highly desirable degree.

Having thus fully described my invention, I claim:—

1. In a dirigible gun, a barrel, a rotary impeller provided with a feed pocket and a conductor communicating therewith, a detent controlling the feed of projectiles to said pocket, a trackway concentric with said impeller, a bulged portion in said trackway, and a wheel connected to said detent and bearing upon said trackway.

2. In a dirigible gun, a rotary impeller having a conductor for projectiles, a pair of detents arranged in the walls of said impeller and having their inner ends normally disposed in the path of projectiles in said conductor, trackways arranged concentric with said impeller, grooved wheels on the outer ends of said detents and engaged with said trackways, and offset portions on said trackways, whereby the detents will be caused to be retracted when the wheels arrive in contact with said portions.

3. In a shouldered firearm, a barrel having a bore, a circular casing depending from an intermediate portion of the firearm, a rotary centrifugal impeller journalled in said casing and having an axial inlet and a peripheral outlet, and means for intermittently discharging projectiles from the outlet of said impeller, the bore of said barrel being tangential to the periphery of said impeller and receiving projectiles discharged from the outlet thereof.

4. In a shouldered firearm, a barrel having a bore, a circular casing depending from an intermediate portion of the firearm, a rotary centrifugal impeller journalled in said casing and having an axial inlet and peripheral outlet, means for supplying projectiles to the axial inlet of said impeller, means for intermittently discharging projectiles from the outlet of said impeller, and means for rotating said impeller, the bore of said barrel being tangential to the periphery of said impeller and receiving projectiles discharged from the outlet thereof.

5. In a shouldered firearm, a barrel having a bore, a circular casing depending from an intermediate portion of the firearm, a rotary centrifugal impeller journalled in said casing and having an axial inlet and peripheral outlet, means for supplying projectiles to the axial inlet of said impeller, automatic means for intermittently discharging projectiles from the outlet of said impeller, and means for rotating said impeller, the bore of said barrel being tangential to the periphery of said impeller and receiving projectiles discharged from the outlet thereof.

6. In a firearm, a barrel having a bore, a casing depending from an intermediate portion of the firearm, a rotary impeller within said casing and having a feed pocket and a conductor communicating therewith, the bore of said barrel being tangential to the periphery of said impeller, a detent controlling the feed of projectiles to said pocket, a trackway concentric with said impeller, a bulged portion in said trackway, and a wheel connected to said detent and bearing upon said trackway.

7. In a firearm, a shouldered stock, a barrel connecting said stock and having a bore, a casing depending from an intermediate portion of the firearm, a rotary impeller within said casing and having an axial inlet and a peripheral outlet, the bore of said barrel being tangential to the periphery of said impeller, a detent for controlling the feed of projectiles to the axial inlet of said impeller, a trackway concentric with said impeller, a bulged portion in said trackway, and a wheel connected to said detent and bearing upon said trackway.

8. A shouldered firearm comprising a butt portion, a barrel portion and an intermediate portion connecting the butt and barrel portions, a circular casing depending from said intermediate portion and communicating with the bore of said barrel portion, the horizontal diameter of said circular casing being disposed in a plane parallel to the longitudinal axis of the firearm, the vertical side walls of said casing being spaced apart to a width less than the width of said intermediate portion, and a centrifugal impeller within said casing for discharging projectiles through the bore of said barrel.

9. A shouldered firearm comprising a butt portion, a barrel portion and an intermediate portion connecting the butt and barrel portions, a circular casing depending from said intermediate portion and having its horizontal diameter disposed in a plane parallel to the longitudinal axis of the firearm, said intermediate portion having a bore connecting the bore of said barrel portion with said casing, said casing having its vertical side walls spaced apart to a width less than the width of said intermediate portion, and a rotary centrifugal impeller journaled in said casing.

10. A shouldered firearm comprising a butt portion, a barrel portion and an intermediate portion connecting the butt and backed up by reflecting means for directing light through the opening in the second-named plate and thence through the diagonally placed opening in the first-named plate.

7. A direction signaling device for vehicles comprising a casing with oppositely disposed light-emitting openings shaped to indicate direction and an intermediate light-emitting opening common to and spaced from the first-named openings for joint use with either, and light-giving units for the several openings with that for the intermediate opening located between the ends thereof and the other light-giving units each located between the end of a respective one of the first-named openings and the adjacent end of the second-named opening.

8. A direction signaling device for vehicles comprising a casing, with oppositely disposed light-emitting openings shaped to indicate direction, and an intermediate light-emitting opening common to and spaced from the first-named openings for joint use with either, and light-giving units for the several openings, with that for the intermediate opening located between the ends thereof and the other light-giving units each located between the end of a respective one of the first-named openings and the adjacent end of the second-named opening, said casing having means for shielding each light giving unit from direct view through the light-emitting openings, whereby glare and confusion of indications is avoided.

9. A direction signaling device for vehicles comprising a casing with a cover portion having opposed direction indicating light-emitting openings and another light-emitting opening between and common to the first-named openings for association with either of said first-named openings to form a pointer, said second-named opening stopping short of the first-named openings where approaching them, light-emitting units located back of the cover member between the ends of the second-named opening and the adjacent portions of the first-named openings, a plate or wall within the casing back of the light-emitting units and provided with an opening therethrough back of the second-named opening and provided with a reflector back of the second-named opening, and a light-giving unit back of the plate or wall to one side of the opening therethrough, whereby light from the last-named light-giving unit is directed by the reflector through the second-named opening and light from the first-named light-giving units is directed through one or the other of the first-named openings in accordance with which one of the light-giving units is energized, whereby the second-named opening may be illuminated or the second-named opening and either of the first-named openings may be illuminated together.

10. A direction signaling device for vehicles comprising a casing having a cover portion with a pair of opposed openings therethrough shaped for pointing purposes and an intermediately positioned elongated opening between the first-named openings to coact with either of the first-named openings to simulate an arrow, a plate within the casing back of and spaced from the cover member, light-giving units between the plate and cover member for illuminating the first-named openings and hidden from direct view by the cover member, webs located on opposite sides of the intermediate opening and between the adjacent ends of the first-named openings to prevent transmission of light from one light-giving unit to the opposite light-emitting opening, and another light-emitting opening back of the plate and located to one side of the second-named opening, said plate having an opening therethrough matching the second-named opening and intermediate of the length thereof and positioned to reflect light from the last-named light-giving unit through the second-named opening in the cover member.

11. A direction signaling device for vehicles comprising a casing having a cover portion with a pair of opposed openings therethrough shaped for pointing purposes and an intermediately positioned elongated opening between the first-named openings to coact with either of the first-named openings to simulate an arrow, a plate within the casing back of and spaced from the cover member, light-giving units between the plate and cover member for illuminating the first-named openings and hidden from direct view by the cover member, webs located on opposite sides of the intermediate opening and between the adjacent ends of the first-named openings to prevent transmission of light from one light-giving unit to the opposite light-emitting opening, and another light-emitting opening back of the plate and located to one side of the second-named opening, said plate having an opening therethrough matching the second-named opening and intermediate of the length thereof and positioned to reflect light from the last-named light-giving unit through the second-named opening in the cover member, the plate having portions behind the first-named openings and in line with the second-named opening bent toward the cover to serve as reflectors, whereby when one of the first-named light-giving units and the second-named light-giving units are energized the apparent length of the second-named light-emitting opening is prolonged into that one of the first-named light-emitting openings remote from the light-giving unit illuminating the other one of the first-named light-emitting openings.

12. A direction signaling device for vehicles comprising a casing with a cover having a pair of oppositely directed light-emitting openings shaped for indicating purposes and a centralized elongated light-emitting opening common to the first-named openings, a plate within the casing back of and spaced from the cover, a light transmitting pane back of and adjacent to the cover to close the openings through the latter, webs on the backing plate within the casing on opposite sides of the second-named opening and between the adjacent portions of the first-named openings, the plate also having a passage therethrough back of the second-named opening and a reflector back of the passage, and light-giving units between the cover member and backing plate and also to the rear of the backing plate adjacent to the reflector and all hidden from direct view through the openings in the cover member.

13. A direction signaling device for vehicles comprising a casing with a cover having a pair of oppositely directed light-emitting openings shaped for indicating purposes and a centralized elongated light-emitting opening common to the first-named openings, a plate within the casing back of and spaced from the cover, a light transmitting pane back of and adjacent to the cover to close the openings through the latter, webs on the backing plate within the casing on opposite sides of the second-named opening and between the adjacent portions of the first-named openings, the plate also having a passage therethrough back of the second-named opening and a reflector back of the passage, and light-giving units between the cover member and backing plate and also to the rear of the backing plate adjacent to the reflector and all hidden from direct view through the openings in the cover member, said backing plate having a flap back of each of the first-named openings in line with the second-named opening and bent toward the cover member to constitute an illuminating prolongation of the second-named opening.

14. A direction signaling device for vehicles comprising a casing with opposed, angular, light-emitting openings in its visible face associated into rectangular form, and another light-emitting opening diagonally arranged with respect to the first-named openings along a line intersecting the apices of the angular openings and spaced at the ends therefrom.

15. Signal means for use on vehicles comprising a casing, a mounting for the casing about which the latter may be moved at will in various directions, a spot-light at and occupying substantially one face of the casing, and a combined tail-light and direction-indicating means occupying substantially the opposite face of the casing.

16. Signal means for vehicles comprising a casing, a mounting for the casing about which the latter may be moved at will in various directions, means at and occupying one face of the casing for projecting a beam of light for use as a spot-light, and means at and occupying the face of the casing remote from the spot-light for producing an intermediately located elongated beam of light to serve as a tail-light and other beams of light coactively related to the tail-light to point in opposite directions, whereby the tail-light beam and either one of the lights at the ends of the tail-light beam constitute pointers to indicate an intended change in the course of travel away from the direct course of travel, the spot-light and direction-signal lights forming a single unit.

In testimony that I claim the foregoing as my own, I have hereto affixed my signature.

HERBERT W. BROWN.

Witnesses:
J. C. FRENTZ,
ANDREW MILLER.